Patented Feb. 14, 1939

2,146,752

UNITED STATES PATENT OFFICE 2,146,752

PREPARATION OF DIVINYL ETHER

William A. Lott, East Orange, N. J., assignor to E. R. Squibb & Sons, New York, N. Y., a corporation of New York No Drawing. Application October 14, 1936, Serial No. 105,514

6 Claims. (Cl. 260—614)

This invention relates to, and has for its object the provision of, a method of preparing divinyl ether.

In the practice of this invention, divinyl ether is prepared by treating a $\beta,\beta'$-dihaloethyl ether with an alkali-metal hydroxide dissolved in a mono-hydroxylated solvent, preferably a monohydroxy alcohol, having little or no tendency to undergo etherification when treated with an alkyl halide in the presence of an alkali-metal hydroxide. Preferably, such solvent is one that contains at least seven carbon atoms, and dissolves a considerable proportion, say from 10% to 20%, of the alkali-metal hydroxide; and preferably, further, the water content of the reaction mixture is low.

For example, in a mechanically agitated reaction vessel heated by an external oil bath having a temperature of 150–160° C., 81 g. of $\beta,\beta'$-dichlorethyl ether is added gradually to a solution of 75 g. of 85% potassium hydroxide in 450 cc. of 2-ethyl hexyl alcohol. The reaction product, after passing through a reflux column in order to return most of the unreacted dichlorethyl ether to the reaction chamber, condenses in a downward column and is collected in a receiver. Then, by washing the distillate with a dilute solution of ammonia and with water, drying with calcium chloride and subsequently with sodium, and fractionally distilling, the desired compound is obtained as a liquid boiling at 27.8–28.6° C.

It is to be understood that the foregoing example is merely illustrative and not limitative of this invention, which may be variously otherwise embodied—as by utilizing other alkali-metal hydroxides, solvents, and procedures—within the scope of the appended claims.

I claim:

1. The method of preparing divinyl ether that comprises treating a $\beta,\beta'$-dihaloethyl ether with an alkali-metal hydroxide dissolved in a monohydric aliphatic alcohol which contains at least seven carbon atoms and is liquid at 160° C.

2. The method of preparing divinyl ether that comprises treating a $\beta,\beta'$-dihaloethyl ether with an alkali-metal hydroxide dissolved in a liquid monohydric aliphatic alcohol containing at least seven carbon atoms.

3. The method of preparing divinyl ether that comprises treating $\beta,\beta'$-dichlorethyl ether with an alkali-metal hydroxide dissolved in a liquid monohydric aliphatic alcohol containing at least seven carbon atoms.

4. The method of preparing divinyl ether that comprises treating a $\beta,\beta'$-dihaloethyl ether with an alkali-metal hydroxide dissolved in 2-ethyl hexyl alcohol.

5. The method of preparing divinyl ether that comprises treating $\beta,\beta'$-dichlorethyl ether with potassium hydroxide dissolved in 2-ethyl hexyl alcohol.

6. The method of preparing divinyl ether that comprises treating $\beta,\beta'$-dichlorethyl ether with potassium hydroxide dissolved in 2-ethyl hexyl alcohol, the ratio of the water content of the reaction mixture to the potassium hydroxide being not more than about 3:17.

WILLIAM A. LOTT.